(12) United States Patent
Burrows

(10) Patent No.: US 11,034,594 B2
(45) Date of Patent: Jun. 15, 2021

(54) TOP FILL RESERVOIR SYSTEM FOR WATER PURIFICATION SYSTEM

(71) Applicant: DS SERVICES OF AMERICA, INC., Atlanta, GA (US)

(72) Inventor: Bruce D. Burrows, Valencia, CA (US)

(73) Assignee: DS SERVICES OF AMERICA, INC., Atlanta, GA (US)

(*) Notice: Subject to any disclaimer, the term of this patent is extended or adjusted under 35 U.S.C. 154(b) by 0 days.

(21) Appl. No.: 16/536,448

(22) Filed: Aug. 9, 2019

(65) Prior Publication Data

US 2020/0048108 A1 Feb. 13, 2020

Related U.S. Application Data

(60) Provisional application No. 62/717,203, filed on Aug. 10, 2018.

(51) Int. Cl.
*C02F 1/44* (2006.01)
*B01D 61/02* (2006.01)
(Continued)

(52) U.S. Cl.
CPC .......... *C02F 1/006* (2013.01); *B01D 61/025* (2013.01); *B01D 61/10* (2013.01); *B01D 61/12* (2013.01); *C02F 1/441* (2013.01); *G05D 9/12* (2013.01); *B01D 2313/243* (2013.01); *B01D 2313/50* (2013.01); *C02F 2209/40* (2013.01); *C02F 2209/42* (2013.01); *C02F 2307/10* (2013.01);
(Continued)

(58) Field of Classification Search
CPC .... G05D 9/00; G05D 9/12; Y10T 137/77287; Y10T 137/7303; Y10T 137/7306; Y10T 137/7313; Y10T 137/1323; Y10T 137/8458; Y10T 137/8342; Y10T 137/8593; Y10T 137/85978; Y10T 137/85986; Y10T 137/86027; Y10T 137/86035; Y10T 137/86043; Y10T 137/86187; B67D 3/0009; C02F 1/441; C02F 2209/42; B01D 2311/2649; B01D 61/025; B01D 61/08
See application file for complete search history.

(56) References Cited

U.S. PATENT DOCUMENTS

| | | | | |
|---|---|---|---|---|
| 5,609,191 A * | 3/1997 | Topping | ................. | B67D 7/002 137/565.17 |
| 6,227,262 B1 * | 5/2001 | Kohl | ....................... | A47L 11/03 141/100 |

(Continued)

*Primary Examiner* — Hailey K. Do
(74) *Attorney, Agent, or Firm* — Seyfarth Shaw LLP; Brian Michaelis

(57) ABSTRACT

A top fill water reservoir system that allows the reservoirs to be filled without waiting for a reverse osmosis (RO) filter to produce enough water to fill the system and avoids the need for a service worker to remove the system from the cabinet, or wait for RO filtration, to fill the reservoirs. The top fill water reservoir system comprises a drinking reservoir adapted to store and dispense drinking water. A supply reservoir in fluid communication with the drinking reservoir and adapted to feed water into the drinking reservoir and receive water from a reverse osmosis (RO) filter. An overflow tube adapted to connect an upper portion of the drinking reservoir to the supply reservoir and feed overflow water from the drinking reservoir to the supply reservoir.

6 Claims, 4 Drawing Sheets

(51) Int. Cl.
*G05D 9/12* (2006.01)
*C02F 1/00* (2006.01)
*B01D 61/10* (2006.01)
*B01D 61/12* (2006.01)

(52) U.S. Cl.
CPC .... *Y10T 137/7303* (2015.04); *Y10T 137/7306* (2015.04); *Y10T 137/8342* (2015.04); *Y10T 137/86027* (2015.04); *Y10T 137/86043* (2015.04)

(56) References Cited

U.S. PATENT DOCUMENTS

| | | |
|---|---|---|
| 2005/0139552 A1 | 6/2005 | Forsberg et al. |
| 2009/0312879 A1 | 12/2009 | Quah |
| 2013/0048669 A1 | 2/2013 | Stolk et al. |
| 2014/0360948 A1 | 12/2014 | Busick |
| 2017/0055760 A1 | 3/2017 | Burrows |

* cited by examiner

TOP FILL RESERVOIR SYSTEM FOR WATER PURIFICATION SYSTEM

CROSS-REFERENCE TO RELATED APPLICATION DATA

This application claims the benefit of U.S. Provisional Patent Application No. 62/717,203 filed on Aug. 10, 2018 the content of which is incorporated by reference herein.

TECHNICAL FIELD

Aspects of the present disclosure generally relate to apparatuses and methods for water purification.

BACKGROUND

Water is necessary for human existence. In many parts of the world, clean drinking water is difficult to obtain. Many different types of water purification systems and methods have been employed to produce clean drinking water throughout the world.

Although many municipal water systems provide clean and/or purified drinking water, filtration systems have become popular in many offices and homes. These filtration systems often employ a filter of particulates contained within an in-line canister to trap, adsorb, and/or otherwise remove certain chemicals and/or other dissolved solids from the incoming water stream. These filters may employ carbon, activated carbon, or other materials to treat the incoming water. Filtration systems may also optionally employ a reverse osmosis filter, either in addition to the particulate filter or instead of the particulate filter, to purify an incoming water supply.

In some filtration systems, a reservoir of purified water may be present to store purified water for on-demand use. Reverse osmosis systems may only generate one gallon of purified water per hour, and as such, a reservoir of purified water may be useful to allow for periods of heavy demand. However, once the reservoir is emptied or empty when initially installed, the water purification system may not be able to provide purified water for an extended period of time.

Additionally, in order to fill the reservoirs within these systems during installation when these systems are empty, a service worker has to fill the reservoir manually. However, the reservoirs cannot be filled while they are installed within a cabinet of the filtration system. Accordingly, in order to fill the reservoir, the service worker needs to remove the reservoirs from the cabinet, along with any tubing and/or fittings used with the filtration system. Once filled, the reservoir needs to be reinstalled into the cabinet. During removal or reinstallation, critical components of the system may become damaged. For example, the system tubing may become crimped and limit water flow through the tubing and hinder performance of the filtration system. Further, tubing and/or fittings may become damaged and require repair.

SUMMARY

The present disclosure provide a top fill water reservoir system and associated method that allows the reservoirs to be filled without waiting for a reverse osmosis (RO) filter to produce enough water to fill the reservoirs and avoids the need for a service worker to remove the system from the cabinet to fill the reservoirs. The system avoids potential crimping of tubing and damage to fittings within the system when removing the reservoirs from the cabinet and reinstalling the filled reservoirs. In one configuration, the top fill water reservoir system comprises a drinking reservoir adapted to store and dispense drinking water. A supply reservoir is in fluid communication with the drinking reservoir and adapted to feed water using an inlet line into the drinking reservoir and receive water from a reverse osmosis (RO) filter. An overflow tube is adapted to connect an upper portion of the drinking reservoir to the supply reservoir and facilitate top-feeding of the drinking reservoir and feed overflow water from the drinking reservoir to the supply reservoir, rapidly filling both the supply and drinking reservoirs. In this manner, with the configuration according to the disclosure, the system can be rapidly filled and brought on-line without the need and delay of disassembling the system; without the potential of damaging critical system components, and without the delay of waiting for the RO filter to filter water to fill both the drinking and supply reservoirs.

The top fill water reservoir system may further comprise a pump in communication with the supply reservoir and adapted to pump the water from the supply reservoir into the drinking reservoir using the inlet line. Further, the drinking reservoir may comprise a cover with a first electronic float, the first electronic float may be adapted to send a signal to the pump that the drinking reservoir is full.

The above summary has outlined, rather broadly, some features and technical advantages of the present disclosure in order that the detailed description that follows may be better understood. Additional features and advantages of the disclosure will be described below. It should be appreciated by those skilled in the art that this disclosure may be readily utilized as a basis for modifying or designing other structures for carrying out the same purposes of the present disclosure. It should also be realized by those skilled in the art that such equivalent constructions do not depart from the teachings of the disclosure as set forth in the appended claims. The novel features, which are believed to be characteristic of the disclosure, both as to its organization and method of operation, together with further objects and advantages, will be better understood from the following description when considered in connection with the accompanying figures. It is to be expressly understood, however, that each of the figures is provided for the purpose of illustration and description only and is not intended as a definition of the limits of the present disclosure.

BRIEF DESCRIPTION OF THE DRAWINGS

For a more complete understanding of the present disclosure, reference is now made to the following description taken in conjunction with the accompanying drawings.

DETAILED DESCRIPTION

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. It will be apparent to those skilled in the art, however, that these concepts may be practiced without these specific details. In some instances, well-known structures and components are shown in block diagram form in order to avoid obscuring such concepts. As described herein, the use of the term "and/or" is intended to represent an "inclusive OR", and the use of the term "or" is intended to represent an "exclusive OR".

Figure 1:
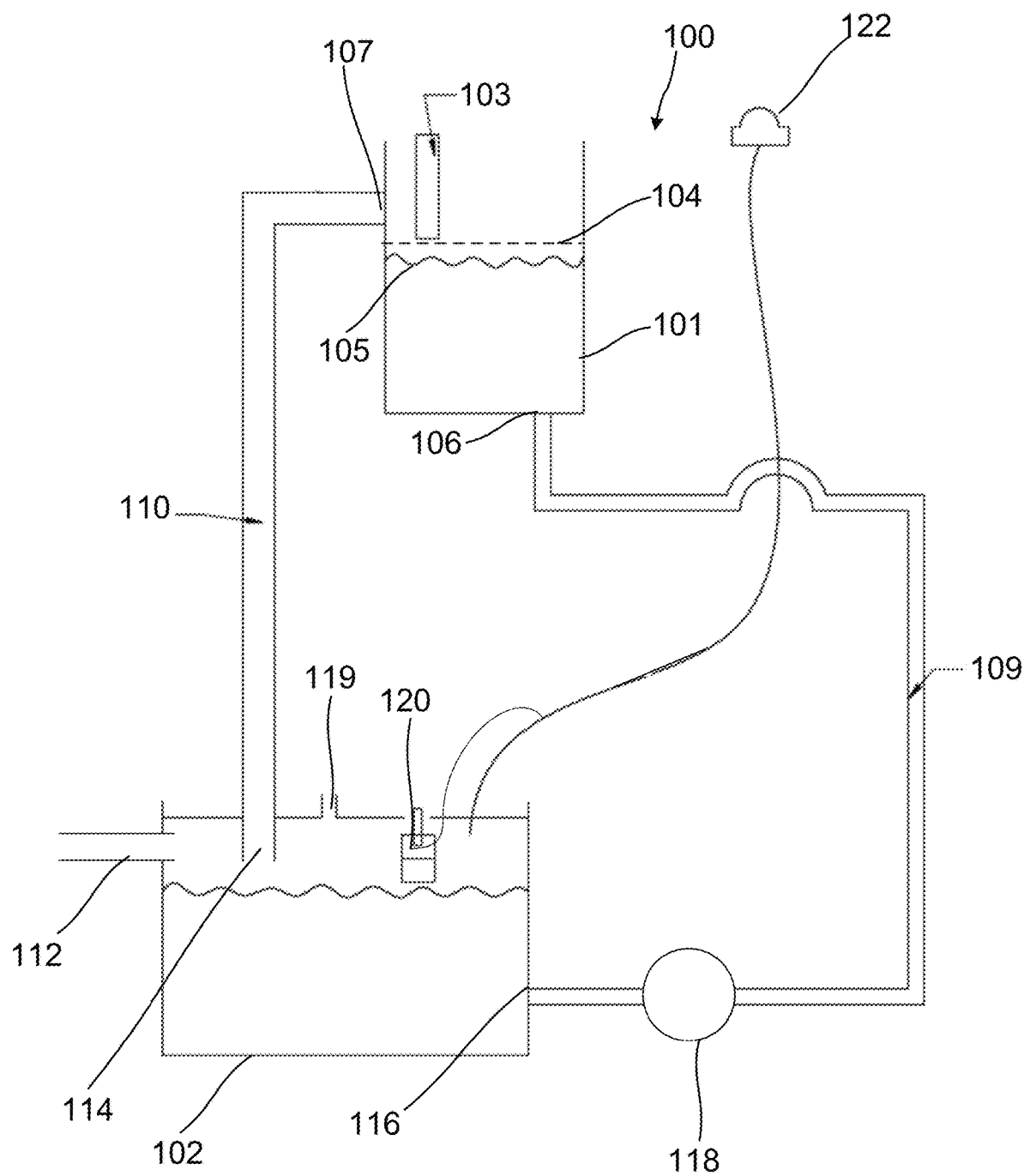
FIG. 1 illustrates a block diagram of a top fill water reservoir system in accordance with an aspect of the present disclosure.
Figure 2:
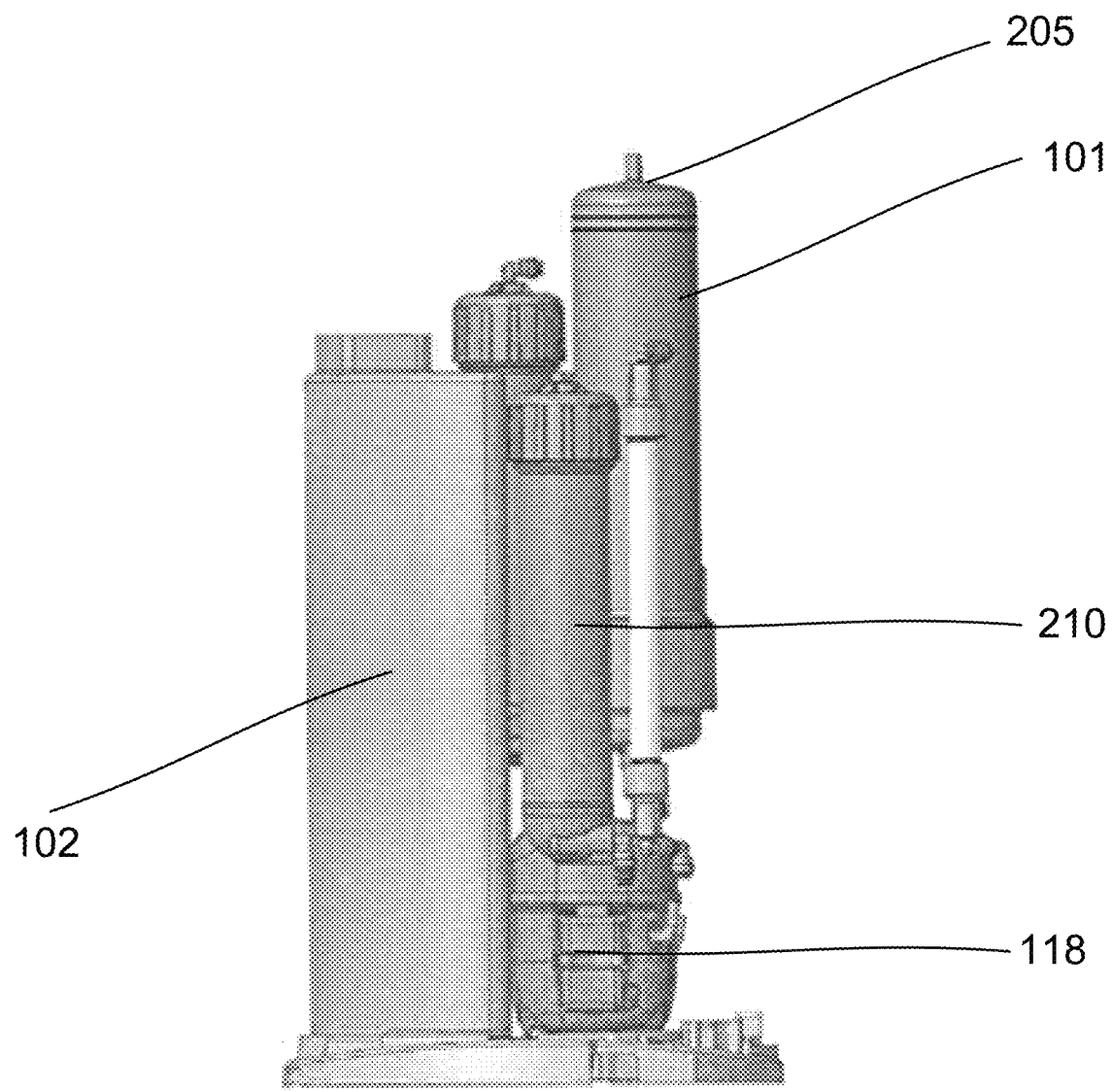
FIG. 2 illustrates a first view of a water filtration and dispenser system for implementing the top fill water reservoir system of FIG. 1 in accordance with an aspect of the present disclosure.
Figure 3:
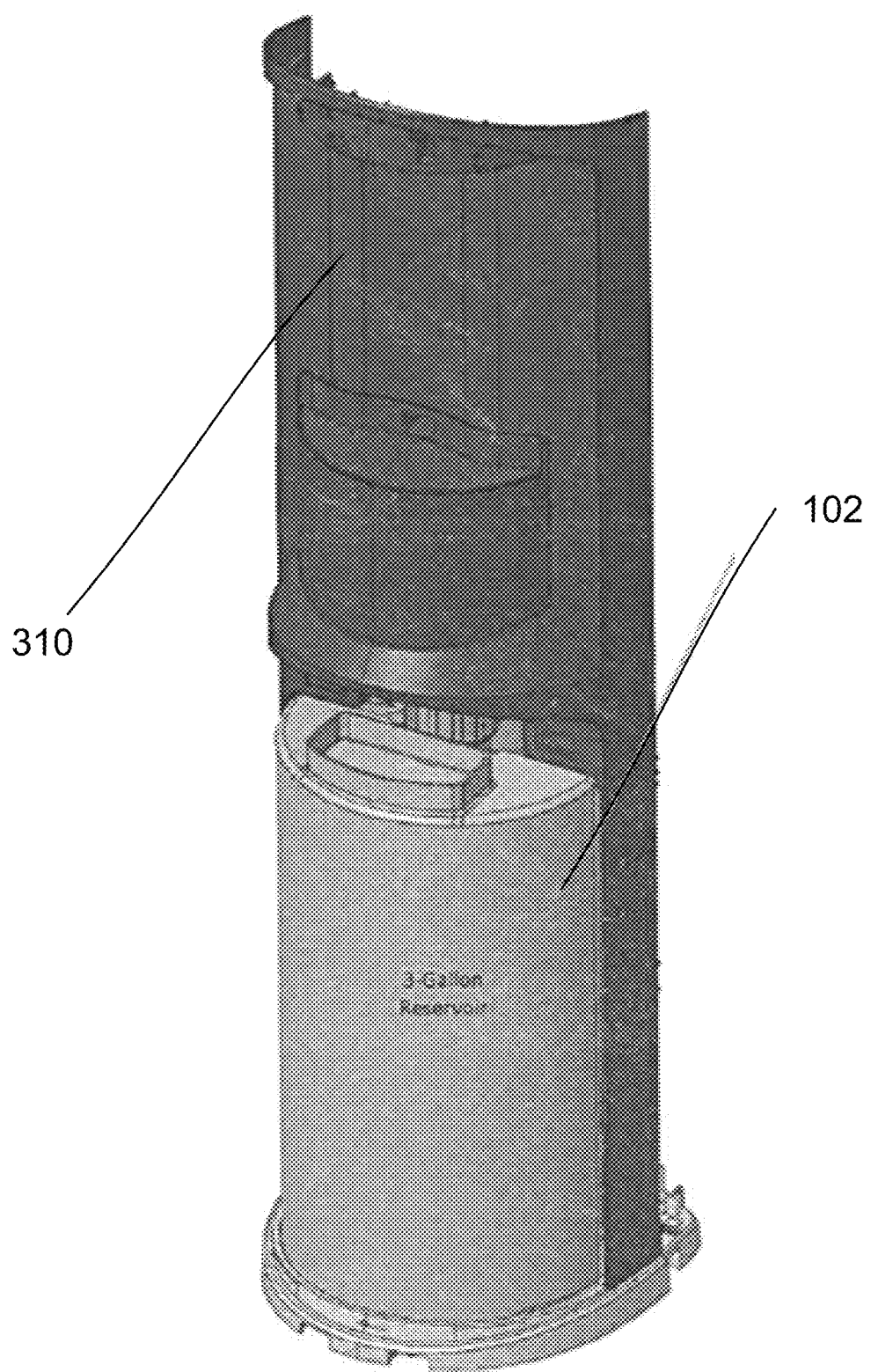
FIG. 3 illustrates a second view of a water filtration and dispenser system for implementing the top fill water reservoir system of FIG. 1 in accordance with an aspect of the present disclosure.

FIGS. 1-3 illustrate a top fill water reservoir system in accordance with an aspect of the present disclosure. System 100 comprises a drinking reservoir 101 and a supply reservoir 102. The drinking reservoir 101 stores an amount of purified water for use for consumption, cooking, or any other desired use. The drinking reservoir may include a cap 205 (shown in FIG. 2) with a drinking reservoir electronic float 103. The electronic float may be adapted to send a signal when a current water level within the drinking reservoir 101 exceeds a trip point water level 104 to prevent overfilling of the drinking reservoir 101. The trip point water level 104 may be the water level in the drinking reservoir where the first electronic float 103 is triggered to stop additional water being supplied to the drinking reservoir. Further, the electronic float 103 may be positioned above a fill point water level 105 within the drinking reservoir 101. The fill point water level 105 may be a level of water that the drinking reservoir 101 is filled to. The drinking reservoir 101 may have a capacity that is less than a capacity of the supply reservoir 102. The capacity of the drinking reservoir may be about 0.5 gallons, however it is not limited to such a capacity.

The drinking reservoir 101 also includes a drinking reservoir inlet 106 and a drinking reservoir outlet 107. The drinking reservoir inlet 106 may be adapted to receive water from the supply reservoir 102 to maintain the fill point water level 105 within the drinking reservoir 101. The water may be received by an inlet line 109. The inlet line 109 may be a pipe and/or other fluid connection from the supply reservoir 102. As the water level within the drinking reservoir exceeds (i.e., rises above) the trip point water level 104, the drinking reservoir outlet 107 removes the excess water by flowing it through the drinking reservoir outlet 107. The drinking reservoir outlet 107 feeds the excess water back into the supply reservoir 103 using an overflow line 110. The drinking reservoir outlet 107 is disposed on an upper portion of the drinking reservoir 101 just above the trip point water level 104. The overflow line 110 may be a pipe and/or other fluid connection to the supply reservoir 103. The overflow line 110 allows the supply reservoir 102 to be filled, when empty, by initially filling the drinking reservoir 101 and having the excess water overflow through the overflow line 110 from the filled drinking reservoir 101 to fill the supply reservoir 102.

The supply reservoir 102 stores a backup supply of water for the drinking reservoir 101 and supplies the drinking reservoir 101 when the amount of water in the drinking reservoir 101 is below a specified amount. The supply reservoir 102 may be supplied with filtered water by a reverse osmosis (RO) filter line 112 adapted to receive filtered water from an RO filter 210. The water received from the RO filter 210 is then stored by the supply reservoir 102 for pumping to the drinking reservoir 201. The RO filter 210 removes other dissolved solids from the fluid within the system 100 by passing the fluid through a porous membrane. When the pressure passing the fluid through the membrane (the hydrostatic pressure) is greater than the pressure required for particles to flow through the membrane (the osmotic pressure), the dissolved solids pass through the membrane in a "reverse" direction away from the fluid flow.

Inlet line 109, overflow line 110, RO filter line 112 may be conduits, tubes, and/or other piping to connect the various components within system 100. Other components may also be included in system 100 without departing from the scope of the present disclosure. Such optional additional components may include compressors, heating elements, valves, controllers, etc., depending on the complexity and application of system 100 in a particular environment.

As illustrated in FIG. 1, the supply reservoir 102 includes an overflow line inlet 114 adapted to receive the excess water from the drinking reservoir 101 via the overflow line 110. The supply reservoir may also have a supply line outlet 116 adapted to supply water to the supply line 109. The supply reservoir 102 may be in fluid connection with a pump 118 that pumps water from the supply reservoir 102 to the drinking reservoir 101 via the supply line 109 when the drinking reservoir 101 is below the water fill point level 105.

The supply reservoir 102 may further include a supply reservoir electronic float 120 adapted to send a signal that the supply reservoir 102 is full. The supply reservoir 102 may have a capacity that is greater than a capacity of the drinking reservoir 101. For example, the capacity of the supply reservoir may be about 3 gallons, however it is not limited to such a capacity. Other capacities may be used depending on the implementation of the system 100. Further, the supply reservoir 102 may include a ventilation aperture 119 that allows air to exit the supply reservoir.

In addition, the system can include a light emitting diode (LED) indicator 122 adapted to receive the signal from the supply reservoir electronic float 120 and provide an indication that the supply reservoir 102 is full based on the received signal from the supply reservoir electronic float 120. While an LED indicator 122 is described, the system 100 can also use any of various other types of indicators that provide an indication that the supply reservoir is full, such as user interface icons, status display indicators or the like.

In regards to the electronic float(s) 103/120, it should be noted that a variety of different sensors and techniques can be used to measure the position of water within or relative amount of water left in the reservoir. For example, in one instance a load cell may be used to determine the percent volume of water left in the reservoir based on the relative weight of the remaining fluid, and thereby determine the relative position of the water level within the reservoir. In other embodiments simple sensors such as Infrared emitters and receivers or Ultrasonic emitters and receivers may be used to accurately determine the position and/or amount of water left in a reservoir. In a separate embodiment, without using any sensors for the water level indicator, the weight of the water in the reservoir can be used to hold closed the bypass valve which will open when the amount of water in the reservoir falls below a certain threshold value indicating that there is not enough water to hold the valve closed.

The present disclosure describes a top fill water reservoir system that allows the reservoirs to be filled without waiting for a reverse osmosis (RO) filter to produce enough water to fill the system and avoids the need for a service worker to remove the reservoir(s) from a cabinet 310 to fill the system. The system avoids potential crimping/damage of tubing and potential damage to fittings within the system when removing and reinstalling the reservoirs to/from the cabinet.

Figure 4:
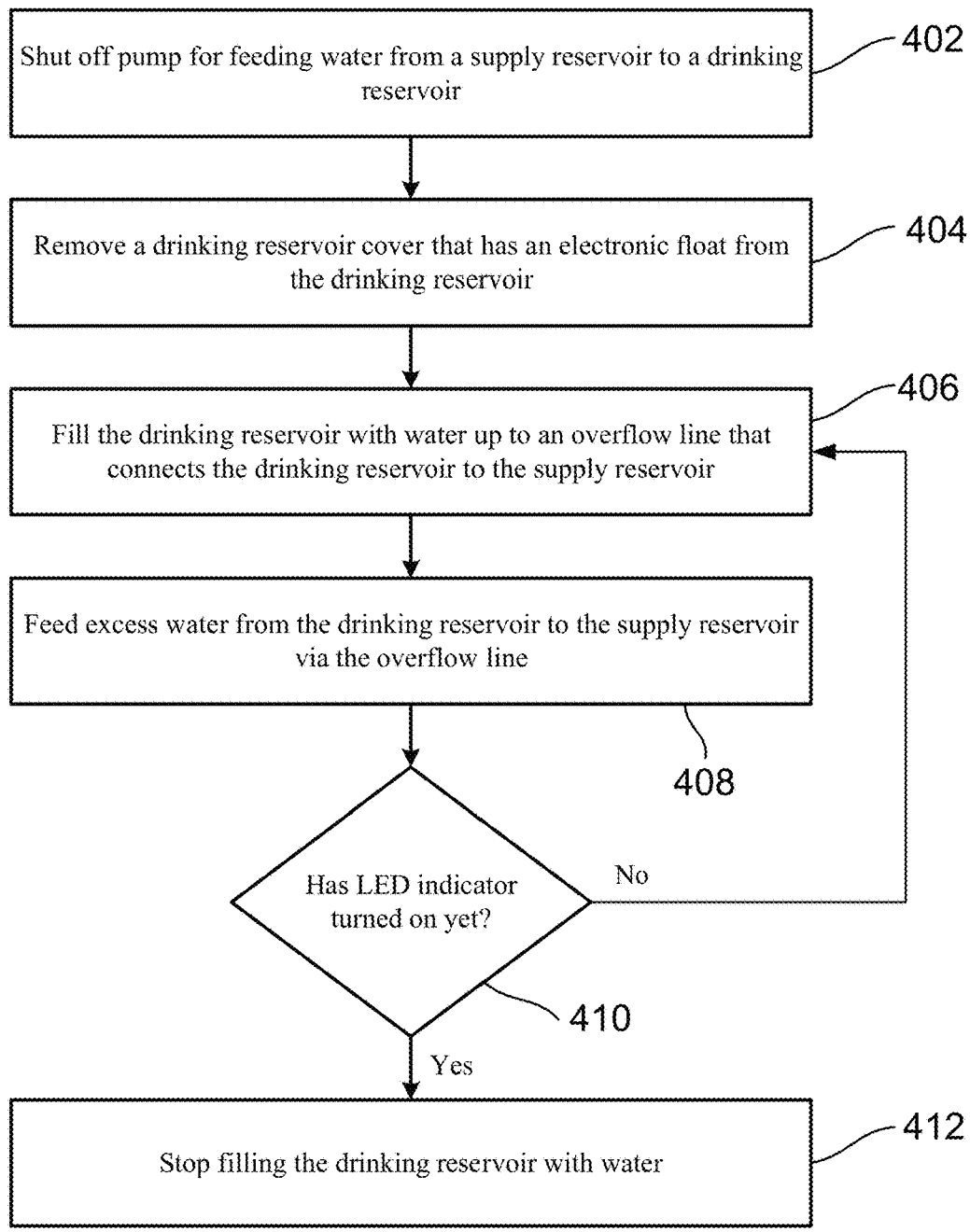
FIG. 4 illustrates a flow diagram for a method associated with the top fill water reservoir system in accordance with an aspect of the present disclosure.

FIG. 4 illustrates a flow diagram for a method 400 associated with the top fill water reservoir system in accordance with an aspect of the present disclosure. The method 400 allows a service worker to use previously filtered bottles of water to expeditiously fill a drinking reservoir and a supply reservoir within a top fill water reservoir system without the delay and potential damage that may occur by removing the reservoirs from a cabinet that houses the reservoirs, and without the delay of waiting for an RO filter to filter water to fill the reservoirs.

At block 402, a pump for feeding water from the supply reservoir to the drinking reservoir within the top fill water reservoir system is shut off. By shutting off the pump, the supply reservoir can be properly filled to the capacity of the supply reservoir. It should be appreciated that during set-up of a system the pump may not be on so this step may not be necessary.

At block 404, a drinking (top) reservoir cover that has an electronic float is removed from the drinking reservoir. Removal of the drinking reservoir cover allows a service worker to fill the top fill water reservoir system with water by filling, in the first instance, the top/drinking reservoir.

At block, 406, the drinking reservoir is filled with water to an overflow line or point in the reservoir where an overflow line is disposed that connects the drinking reservoir to the supply (bottom) reservoir. At block 408, excess water (i.e., water that is above a level where the overflow line is disposed on the drinking reservoir) is fed from the drinking reservoir to the supply reservoir via the overflow line. Since water is continuously being poured into the drinking reservoir, water will keep entering the overflow line and be fed to and fill the supply reservoir. The overflow line allows the supply reservoir to be filled by initially filling the drinking reservoir and taking the excess water from the filled drinking reservoir to fill the supply reservoir.

The system may have a light emitting diode (LED) or other indicator interconnected with the supply reservoir float that indicates when the supply reservoir is full. At block 410, when the supply reservoir float is not actuated the LED indicator has not turned on yet, the drinking reservoir will continue to be filled with more water and the excess water will continue to fill the supply reservoir. When the supply reservoir float is actuated, the LED indicator turns indicating that the supply reservoir is full. Accordingly, at block 412, no additional water needs to be poured into the system since both reservoirs are full. This allows the drinking reservoir to immediately dispense purified water from the system and prevents the need to remove the reservoirs from the cabinet to fill the reservoirs. Additionally, the method 400 avoids potential crimping of tubing and potential damage to fittings within the system when removing the reservoirs to be filled from and reinstalling the filled reservoirs into the cabinet. The delay in (and cost of having a service person) waiting for RO filtered water to be processed to bring a system on-line (either after repair or initial installation) is avoided.

Although the present disclosure and its advantages have been described in detail, it should be understood that various changes, substitutions and alterations can be made herein without departing from the technology of the disclosure as defined by the appended claims. For example, relational terms, such as "above" and "below" are used with respect to components. Of course, if the component is inverted, above becomes below, and vice versa. Additionally, if oriented sideways, above and below may refer to sides of a component. Moreover, the scope of the present application is not intended to be limited to the particular configurations of the process, machine, manufacture, composition of matter, means, methods and steps described in the specification. As one of ordinary skill in the art will readily appreciate from the disclosure, processes, machines, manufacture, compositions of matter, means, methods, or steps, presently existing or later to be developed that perform substantially the same function or achieve substantially the same result as the corresponding configurations described herein may be utilized according to the present disclosure. Accordingly, the appended claims are intended to include within their scope such processes, machines, manufacture, compositions of matter, means, methods, or steps.

It should be understood that when an element is referred to as being "connected" or "coupled" to another element (or variations thereof), it can be directly connected or coupled to the other element or intervening elements may be present. In contrast, when an element is referred to as being "directly connected" or "directly coupled" to another element (or variations thereof), there are no intervening elements present.

Benefits, other advantages, and solutions to problems have been described herein with regard to specific embodiments. However, the benefits, advantages, solutions to problems, and elements that may cause any benefit, advantage, or solution to occur or become more pronounced are not to be construed as critical, required, or essential features or elements of the disclosure. It should be appreciated that in the appended claims, reference to an element in the singular is not intended to mean "one and only one" unless explicitly so stated, but rather "one or more."

The description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

Although several embodiments have been described in detail for purposes of illustration, various modifications may be made without departing from the scope and spirit of the present disclosure. Accordingly, the disclosure is not to be limited by the examples presented herein, but is envisioned as encompassing the scope described in the appended claims and the full range of equivalents of the appended claims.

What is claimed is:

1. A method for a top fill water reservoir system, the method comprising:
    shutting off pump for feeding water from a supply reservoir to a drinking reservoir within the top fill water reservoir system;
    removing a drinking reservoir cover that has a first electronic float from the drinking reservoir;
    filling the drinking reservoir with water to an overflow line that connects the drinking reservoir to the supply reservoir;
    feeding excess water from the drinking reservoir to the supply reservoir via the overflow line; and
    filling the drinking reservoir with water until a light emitting diode (LED) indicator turns on, wherein the LED indicator turns on when the LED indicator receives a signal from a second electronic float disposed on the supply reservoir, the signal indicating the supply reservoir is full.

2. The method of claim 1, further comprising positioning the drinking reservoir cover on the drinking reservoir when the top fill water reservoir system is full.

3. The method of claim 2, wherein after the drinking reservoir cover is positioned, the first electronic float is disposed within the drinking reservoir above a water level fill point for the drinking reservoir.

4. The method of claim 1, wherein the overflow line is connected to an upper portion of the drinking reservoir that is above a water level fill point.

5. The method of claim 1, further comprising venting the top fill water reservoir system via a ventilation aperture that allows air to exit the supply reservoir.

6. The method of claim 1, further comprising disposing the first electronic float above a water level fill point for the drinking reservoir when the drinking reservoir cover is in position on the drinking reservoir.

\* \* \* \* \*